United States Patent [19]

Eshraghi et al.

[11] Patent Number: 4,486,397
[45] Date of Patent: Dec. 4, 1984

[54] GROUP IIIB METALLOPHOSPHATES

[75] Inventors: Reza Eshraghi, Broadview Heights; Frederick A. Pesa, Aurora; Mike J. Desmond, Cleveland Heights, all of Ohio

[73] Assignee: The Standard Oil Company, Cleveland, Ohio

[21] Appl. No.: 565,998

[22] Filed: Dec. 27, 1983

[51] Int. Cl.$^3$ .............................................. C01B 25/36
[52] U.S. Cl. ..................................... 423/306; 502/208
[58] Field of Search ......................... 423/306; 502/208

[56] References Cited

U.S. PATENT DOCUMENTS 3,443,892  5/1969  Wacks et al. ........................ 423/306
3,981,970  9/1976  Wada et al. .......................... 423/306
4,178,354 12/1979  Murata et al. ....................... 423/306
4,418,048 11/1983  Dyer et al. .......................... 423/306

FOREIGN PATENT DOCUMENTS 2451843  5/1975  Fed. Rep. of Germany ...... 423/306

OTHER PUBLICATIONS

Kanepe et al., "Preparation of Double Scandium-Ammonium Pyrophosphate", *Inorg. Mater.* (USA), vol. 15, No. 12, (Dec. 1979), pp. 1717–1719.

*Primary Examiner*—John Doll
*Assistant Examiner*—Wayne A. Langel
*Attorney, Agent, or Firm*—Salvatore P. Pace; David J. Untener; Larry W. Evans

[57] ABSTRACT

Crystalline Group IIIB metallophosphates are provided herein having a composition in terms of mole ratios of oxides in the synthesized state of:

$$X(M'_2O):Y(M_2O_3):Z(P_2O_5):nH_2O \quad (I)$$

wherein
M' is an alkali metal;
M is a Group IIB metal;
x/y is a number from about 1.1 to about 1.9;
z/y is a number from about 1 to about 1.9
n/y is a number from about 0 to about 8.

Also provided is the use of these metallophosphates as ion exchange materials.

13 Claims, No Drawings

GROUP IIIB METALLOPHOSPHATES

BACKGROUND OF THE INVENTION

1. Field of the Invention

The present invention relates to a novel family of crystalline molecular sieves. More particularly, it relates to crystalline, microporous Group IIIA metallophosphates and their use.

2. Description of Art

Molecular sieves of the crystalline zeolite type are well known in the art as over 150 synthetic zeolite compositions and 40 naturally occurring zeolite minerals are known. In general, the crystalline zeolites are aluminosilicates of Group IA and IIA elements whose inorganic polymer framework are formed from $AlO_4$ and $SiO_4$ tetrahedra joined by the sharing of oxygen atoms or ions. They are characterized by having pore openings of uniformed dimensions, having a significant ion-exchange capacity and being capable of reversibly desorbing an adsorbed phase which is dispersed through the internal void of the crystal without displacing any atoms which make up the permanent crystal structure.

Other molecular sieves which have crystalline microporous phases which are not zeolitic, i.e. do not contain $AlO_4$-tetrahedra in combination with $SiO_4$ as essential framework constituents, but exhibit the ion-exchange and/or adsorption characteristics of the zeolitic phases are also known. These molecular sieves have uniformed pores, are capable of reversibly adsorbing molecules and, like zeolites, can exhibit thermal stablity. Examples of nonzeolitic molecular sieves include aluminophosphates, metallo silicates and silica-polymorphs.

Molecular sieves, both zeolitic type and nonzeolitic type, are known to have catalytic capabilities for various hydrocarbon conversion reactions such as alkylation, cracking, hydrocracking, isomerization, etc., adsorption capabilities for the separation of vapor or liquid mixtures, and ion exchange capabilities.

As mentioned above, molecular sieves have a framework structure comprised of channels or interconnected voids which are precisely uniformed in size and can accept, for adsorption purposes molecules of certain dimensions while rejecting those of larger dimensions. Further, these channels or voids are occupied by water molecules or cations which are mobile and can ordinarily undergo ion exchange. By altering the framework structure and/or by cation exchange or removal, molecular sieves can be tailored to exhibit particular functions or properties.

We have now discovered a new class of molecular sieve materials which are microporous, 3-dimensional crystalline Group IIIB metallophosphates having uniform pore dimensions and exhibiting ion exchange capabilities.

SUMMARY OF THE INVENTION

In accordance with the present invention, a novel family of crystalline Group IIIB metallophosphate molecular sieves is provided having a composition in terms of mole ratios of oxides in the synthesized state as follows:

$$X(M'_2O):Y(M_2O_3):Z(P_2O_5):nH_2O \qquad (I)$$

wherein
M' is an alkali metal;
M is a Group IIIB metal;
x/y is a number from about 1.1 to about 1.9;
z/y is a number from about 1 to about 1.9; and
n/y is a number from about 0 to about 8.

Also provided herein are the use of the molecular sieves of formula I in ion exchange reactions.

The yttrium phosphates molecular sieves of one embodiment of this invention generally exhibit a powder X-ray diffraction pattern observed with CuKα radiation and a scan of 3° to 50° θ of at least:

| d (A) |
| --- |
| 16.0 ± 0.2 |
| 9.2 ± 0.2 |
| 7.9 ± 0.2 |
| 6.8 ± 0.1 |
| 5.45 ± 0.05 |
| 4.47 ± 0.05 |
| 4.49 ± 0.05 |
| 3.79 ± 0.03 |
| 3.69 ± 0.03 |
| 3.38 ± 0.03 |
| 3.17 ± 0.03 |
| 3.06 ± 0.03 |
| 2.99 ± 0.03 |
| 2.94 ± 0.02 |
| 2.86 ± 0.02 |
| 2.77 ± 0.02 |
| 2.72 ± 0.02 |
| 2.68 ± 0.02 |

DETAILED DESCRIPTION OF THE INVENTION

The present molecular sieves are generally prepared by the hydrothermal crystallization of a reaction mixture prepared by combining a reactive source of phosphorus, a Group IIIB metal or metal oxide source, water and a suitable cation source, preferably an alkali metal source such as an alkali metal hydroxide in a basic solution.

Broadly, the preparative process comprises forming a reaction mixture of the matallophosphate components which when properly mixed and dried will have a composition in terms of mole ratios of oxides as shown in Formula I.

To prepare the preparation mixture, a source of phosphorus is first added to a Group IIIB metal source and stirred until a precipitate is formed. The reactive phosphorus source includes but is not limited to phosphoric acid and phosphoric oxides. Illustrative Group IIIB metals include scandium, yttrium, and lanthanum or combinations thereof with yttrium being preferred. Generally, the Group IIIB metal source will be the form of a Group IIIB metal oxide, hydroxide or halide. The alkali cation source is then added to the mixture, generally in the form of a compound containing a basic anion which will make the solution alkaline. Alkali hydroxides have been found to be suitable for this purpose. The preferred alkali cations are sodium and potassium cations with sodium being most preferred. The above reaction mixture is preferably comprised of carbon-free compounds.

The reaction mixture is then placed in a reaction vessel which is inert towards the reaction mixture and heated at a temperature of at least about 70° C., preferably between about 125° C. to about 300° C. under autogeneous pressure. The heating is continued until the reaction mixture is crystallized, usually a period from about 2 hours to about 2 weeks depending on the temperature of the preparation. Generally, at about 170° C. and autogeneous pressure, the crystallization occurs in about 5 days.

The solid crystal in the reaction product is then recovered by any convenient method, such as filtration or centrifugation, washed with water and dried at temperatures of between ambient and about 200° C., usually about 100° C. to about 120° C., in a suitable atmosphere such as air.

It is generally desirable during the synthesis of the molecular sieves of this invention to control the base to Group IIIA metal ratio used in the synthesis mixture with the ratio being dependent upon Group IIIB metal employed. A low base/metal ratio can result in the formation of an amorphous product while a high ratio can result in the formation of a crystalline product which does not exhibit the characteristic molecular sieve structure. Generally, the base/Group IIIB metal ratio varies from about 1 to about 12 depending on the Group IIIB metal selected. In the case of yttrium, a preferred emodiment of the present invention, the base/metal ratio ranges from about 2 to about 8. Exampls of suitable bases include but are not limited to hydroxides, acetates and carbonates.

In the most preferred crystallization method, the source of phosphate is orthophosphoric acid, the source of the Group IIIB metal is metal oxides or metal halides, most preferably oxides, the heating temperature is from about 150° C. to about 200° C. and the crystallization time is form about 1 to 7 days.

The molecular sieves prepared in accordance with the instant invention can be formed in a wide variety of particular sizes and shapes. Generally, the particles can be in the form of powder, a granule, or a molded product such as an extrudate.

As in the case with many catalysts, it may be desirable to incorporate into the new crystalline molecular sieves another material resistant to the temperatures and other conditions employed in various organic processes or which exhibit desirable catalytic properties. Such materials include active and inactive materials such as synthetic and naturally occurring zeolites, alumina, clay, silica, and various metals and metal oxides.

SPECIFIC EMBODIMENTS

The method of preparation and the physical and chemical properties of various members of the present class of novel molecular sieves are illustrated and characterized in the following examples.

In the X-ray diffraction patterns below, the relative intensities are given in terms of the symbols vs=very strong, s=strong, m=medium, w=weak, and vw=very weak. All X-ray patterns were obtained using standard X-ray powder diffraction techniques. The radiation source was a standard intensity, copper target, X-ray tube operated at 40 Kv and 20 ma. The diffraction pattern from the K α radiation was suitably recorded by an X-ray spectrometer scintillation counter, plus height analyzer and strip chart recorder. Flat compressed powder samples were scanned at 1° per minute, using a two second time constant. Interplanar spacings (d) were obtained from the position if the diffraction peaks expressed as 2θ where θ is the Bragg angle as observed on the strip chart. Intensities are determined from the heights of diffraction peaks after subtracting background.

EXAMPLE 1

A reaction mixture was prepared by combining 1.5 grams of an 82 percent (by weight) orthophosphoric acid ($H_3PO_4$) solution to 3 grams of water. To the reaction mixture was added 1.12 grams of yttrium oxide ($Y_2O_3$) and the reaction mixture was stirred for approximately 5 minutes. To this mixture was added a solution of 2 grams of a 50 percent sodium hydroxide solution and 4 grams of water and stirred well until a homogeneous gel was formed. The composition of final reaction mixture in molar oxide ratios was:

| | |
|---|---|
| $P_2O_5/Y_2O_3$ | 1.26 |
| $NaOH/Y_2O_3$ | 5.04 |
| $H_2O/Y_2O_3$ | 92.7 |

The reaction mixture was charged to a Teflon ® lined stainless steel pressure vessel and heated in an oven at 170° C. at autogeneous pressure for about 137 hours. The solid reaction product was recovered by filtration, washed with water and dried at 120° C. for about 2 hours. The resulting metallophosphate had an X-ray powder diffraction pattern characterized in Table I wherein "d" is the interplanar spacing and "I" is the relative intensity.

TABLE I

| SPACING (d) AND RELATIVE INTENSITY (I) | |
|---|---|
| d (INTERPLANAR SPACING) | I (RELATIVE INTENSITY) |
| 16.2 | VS |
| 9.2 | M |
| 8.0 | W |
| 6.8 | S |
| 6.22 | W |
| 5.47 | M |
| 5.19 | VW |
| 4.6 | W |
| 4.51 | W |
| 4.41 | W |
| 3.8 | M |
| 3.69 | W |
| 3.46 | W |
| 3.39 | M |
| 3.32 | W |
| 3.18 | M |
| 3.08 | M |
| 3.05 | M |
| 3.00 | M |
| 2.95 | W |
| 2.85 | M |
| 2.78 | M |
| 2.72 | S |
| 2.68 | M |
| 2.63 | W |
| 2.54 | VW |
| 2.46 | W |
| 2.42 | W |
| 2.26 | W |

EXAMPLE 2

A reaction mixture was prepared by combining 45 grams of an 82 percent orthophosphoric acid solution to 100 grams of water. To this reaction mixture was added 28 grams of yttrium oxide ($Y_2O_3$) and the reaction mixture was stirred well. To this mixture was added 65 grams of a 50 percent sodium hydroxide solution and 100 grams of water and again stirred well until a homogeneous gel was formed. The composition of final mixture expressed in molar oxide ratios was:

| | |
|---|---|
| $P_2O_5/Y_2O_3$ | 1.52 |
| $NaOH/Y_2O_3$ | 6.55 |
| $H_2O/Y_2O_3$ | 107.88 |

The reaction mixture was sealed in a Teflon® lined stainless steel pressure vessel and heated at 170° C. at autogenous pressure for about 15 hours. The solid reaction product was recovered by filtration and washed with water and dried at 120° C. for 3 hours. The metallophosphate has an X-ray powder pattern characterized in Table II.

TABLE II

SPACING (d) AND RELATIVE INTENSITY (I)

| d (INTERPLANAR SPACING) | I (RELATIVE INTENSITY) |
|---|---|
| 16.3 | VS |
| 9.4 | W |
| 8.1 | W |
| 6.88 | M |
| 6.31 | W |
| 5.51 | M |
| 5.22 | VW |
| 4.62 | W |
| 4.53 | W |
| 4.45 | W |
| 3.83 | M |
| 3.71 | W |
| 3.48 | W |
| 3.41 | M |
| 3.33 | W |
| 3.19 | M |
| 3.09 | M |
| 3.02 | S |
| 2.97 | W |
| 2.87 | S |
| 2.8 | S |
| 2.74 | S |
| 2.7 | S |
| 2.65 | W |
| 2.55 | W |
| 2.47 | W |
| 2.44 | W |
| 2.35 | W |
| 2.28 | W |

A portion of this molecular sieve product was calcined at about 300° C. for 2 hours. The X-ray pattern of a calcined sample was essentially the same as that of the original sample indicating the high thermal stability of the material.

EXAMPLE 3

A reaction mixture was prepared using the same procedure as described in Example 1. The composition of the final reaction mixture expressed in molecular oxide ratios was:

| | |
|---|---|
| $P_2O_5/Y_2O_3$ | 1.52 |
| $NaOH/Y_2O_3$ | 6.55 |
| $H_2O/Y_2O_3$ | 107.88 |

The X-ray powder pattern of the product is essentially the same as the metallophosphate of Example 1.

EXAMPLE 4

A reaction mixture was prepared by combining 1.3 grams of an 82 percent orthophosphoric acid solution to 3 grams of water. To this mixture was added 1.51 grams of yttrium chloride ($YCl_3.6H_2O$) dissolved in two grams of water. To this reaction mixture was added a solution of 4 grams of a 50 percent sodium hydroxide solution and the mixture was stirred well until a homogeneous gel was formed. The composition of the final reaction mixture expressed in molecular oxide ratios was:

| | |
|---|---|
| $P_2O_5/Y_2O_3$ | 2.18 |
| $NaOH/Y_2O_3$ | 20.07 |
| $H_2O/Y_2O_3$ | 214.12 |

The mixture was charged to a Teflon® lined stainless steel pressure vessel and heated in an oven at 170° C. for about 111 hours. The product was recovered by filtration, washed with water and dried at 120° C. for 2 hours. The metallophosphate had an X-ray powder pattern characterized in Table III.

TABLE III

SPACING (d) AND RELATIVE INTENSITY (I)

| d (INTERPLANAR SPACING) | I (RELATIVE INTENSITY) |
|---|---|
| 16.0 | VS |
| 9.2 | M |
| 7.9 | M |
| 6.8 | S |
| 6.21 | W |
| 5.48 | M |
| 5.18 | VW |
| 4.59 | W |
| 4.5 | W |
| 4.4 | W |
| 3.8 | M |
| 3.68 | W |
| 3.45 | W |
| 3.38 | M |
| 3.32 | W |
| 3.17 | M |
| 3.08 | M |
| 3.05 | M |
| 2.99 | S |
| 2.95 | W |
| 2.85 | S |
| 2.78 | S |
| 2.72 | S |
| 2.68 | M |
| 2.64 | W |
| 2.54 | VW |
| 2.46 | W |
| 2.43 | W |
| 2.42 | W |
| 2.36 | VW |
| 2.26 | W |
| 2.16 | VW |
| 2.09 | W |

EXAMPLE 5

A reaction mixture was prepared by combining 12 grams of an 82 percent orthophosphoric acid solution to 24 grams of water. To this mixture was added 8.96 g. of $Y_2O_3$ and stirred well. A second solution was made by mixing 32 grams of $H_2O$ with 16 grams of a 50 percent sodium hydroxide solution and this mixture was added to the original mixture and stirred well. The final mixture was charged to a Teflon® lined stainless steel reactor and the reactor was kept at 170° C. for about 117 hrs. The product was then removed, washed with water and dried at 110° C. for 2 hrs. The major lines of the X-ray diffraction powder pattern are shown Table IV. The metallophosphate was analyzed by inductive coupled plasma emission spectroscopy and had the following chemical composition on a weight percent basis:

| | |
|---|---|
| Phosphorus | 14 |
| Yttrium | 27 |
| Sodium | 11 | which represents a molar ratio of Na/Y of 1.58.

TABLE IV

SPACING (d) AND RELATIVE INTENSITY (I)

| d (INTERPLANER SPACING) | I (RELATIVE INTENSITY) |
|---|---|
| 16.0 | VS |
| 9.18 | W |
| 6.76 | S |
| 5.45 | M |
| 4.49 | W |
| 3.79 | W |
| 3.38 | W |
| 3.17 | M |
| 3.66 | W |
| 2.99 | M |
| 2.94 | W |
| 2.86 | W |
| 2.72 | M |
| 2.68 | M |

EXAMPLE 6

A portion of the metallophosphate prepared in Example 5 was calcined at 350° C. for 2 hrs. The major lines of the X-ray powder pattern of this material, shown in Table V, indicate the maintenance of crystallinity with no new phases appearing.

TABLE V

SPACING (d) AND RELATIVE INTENSITY (I)

| d (INTERPLANER SPACING) | I (RELATIVE INTENSITY) |
|---|---|
| 16.1 | VS |
| 9.22 | M |
| 6.81 | S |
| 5.46 | M |
| 4.50 | W |
| 3.78 | W |
| 3.39 | W |
| 3.17 | M |
| 3.07 | W |
| 2.99 | M |
| 2.95 | W |
| 2.87 | W |
| 2.72 | M |
| 2.68 | M |

EXAMPLES 7 AND 8

Two samples of the yttrium phosphate material of Example 5 weighing approximately 1 gram each were contacted with 0.1M solutions of magnesium chloride and ammonia chloride, respectively, for about 24 hours at room temperature (about 25° C.). The materials were then washed with distilled water, dried at 110° C. overnight (about 15 hours) and analyzed. The ion exchange metallophosphates had the following compositions on a molar ratio basis:

| | |
|---|---|
| Example 7 | Na/Y = 0.69 |
| | Mg/Y = 0.22 |
| Example 8 | Na/Y = 1.0 |
| | N/Y = 0.56 |

EXAMPLES 9 AND 10

Two samples of the metallophosphate composition of Example 2 weighing approximately 1 gram each were contacted with 20 cc of 0.1M solutions of calcium chloride and cesium chloride, respectively for 3 hours at room temperature. The samples were then washed with distilled water, dried at 110° C. and analyzed. The ion exchanged metallophosphates had the following compositions on a molar ratio basis:

| | |
|---|---|
| Example 9 | Ca/Y = 0.51 |
| | Na/Y = 0.42 |
| Example 10 | Cs/Y = 0.15 |
| | Na/Y = 1.21 |

EXAMPLE 11

Adsorption Reactions

The adsorption capacity of the material prepared in Example 5 was measured using a standard McBain-Baker gravimetric adsorption apparatus. A 0.1 gram sample of the material was placed in the apparatus and heated under vacuum. The following data was obtained after heating the material at 300° C. until the weight of the material was unchanged:

| | KINETIC DIAMETER | PRESSURE TORR | TEMPERATURE °C. | WEIGHT PERCENT ADSORBED |
|---|---|---|---|---|
| $H_2O$ | 2.65 | 4.695 | 23 | 12.1 |
| $H_2O$ | 2.65 | 19.5 | 23 | 16.3 |
| $O_2$ | 3.46 | 47.8 | −196 | 1.3 |
| $O_2$ | 3.46 | 114.6 | −196 | 1.8 |

EXAMPLE 12

A portion of the material prepared in Example 5 was contacted with a 1M. solution of $NH_4Cl$ for three hours at 60° C. three consecutive times. The material was then washed thoroughly with water and dried at 110° C. for two hours. The major lines of the X-ray powder pattern of this material, shown in Table VI, indicates that the ion exchanged material maintains its crystallinity after ion exchange.

TABLE VI

SPACING (d) AND RELATIVE INTENSITY (I)

| d (INTERPLANER SPACING) | I (RELATIVE INTENSITY) |
|---|---|
| 16.0 | VS |
| 9.18 | V |
| 6.76 | S |
| 5.45 | M |
| 4.49 | W |
| 3.79 | W |
| 3.38 | W |
| 3.17 | M |
| 3.06 | W |
| 2.99 | M |
| 2.94 | W |
| 2.86 | W |
| 2.72 | M |
| 2.68 | M |

It is to be understood that the present invention is not to be limited by the examples set forth herein which have been provided merely to demonstrate operability. The scope of this invention includes equivalent embodi-

What is claimed is:

1. Crystalline Group IIIB metallophosphates having a composition in terms of mole ratios of oxides in the synthesized state of:

$$X(M'_2O):Y(M_2O_3):Z(P_2O_5):nH_2O \quad (I)$$

wherein

M' is an alkali metal;

M is a Group IIIB metal;

x/y is a number from about 1.1 to about 1.9;

z/y is a number from about 1 to about 1.9 n/y is a number from about 0 to about 8.

2. The composition of claim 1 wherein said Group IIIB metal is selected from the group of scandium, yttrium, lanthanum and combinations thereof.

3. The composition of claim 2 wherein the Group IIIB metal is yttrium.

4. The crystalline matallophosphate of claim 3 characterized by a powder X-ray diffraction pattern observed with CuKα radiation and a scan of 3° to 50° θ of at least:

| |
|---|
| 16.0 ± 0.2 |
| 9.2 ± 0.2 |
| 7.9 ± 0.2 |
| 6.8 ± 0.1 |
| 5.45 ± 0.05 |
| 4.47 ± 0.05 |
| 4.49 ± 0.05 |
| 3.79 ± 0.03 |
| 3.69 ± 0.03 |
| 3.38 ± 0.03 |
| 3.17 ± 0.03 |
| 3.06 ± 0.03 |
| 2.99 ± 0.03 |
| 2.94 ± 0.02 |
| 2.86 ± 0.02 |
| 2.77 ± 0.02 |
| 2.72 ± 0.02 |
| 2.68 ± 0.02 |

5. A process for preparing a crystalline Group IIIB metallophosphates having a composition in terms of mole ratio of oxides in the synthesized state of:

$$X(M'_2O):Y(M_2O_3):Z(P_2O_5):nH_2O \quad (I)$$

wherein

M' is an alkali metal;

M is a Group IIIA metal;

x/y is a number from about 1.1 to about 1.9;

z/y is a number from about 1 to about 1.9 n/y is a number from about 0 to about 8, said process comprising wherein a source of phosphorus is added to a solution containing a Group IIIA metal source, stirring said solution, adding to said solution an alkali cation source to form a reaction mixture, heating said reaction mixture at a temperature of at least 70° C. under autogeneous pressure until crystals are formed, and recovering said crystals from said reaction mixture.

6. The process of claim 5 wherein the ratio of base to Group IIIB metal is from about 1 to about 12.

7. The process of claim 6 wherein said source of phosphorus is phosphoric acid, said Group IIIB metal source is in the form of a metal oxide and said alkali cation source is in the form of an alkali hydroxide.

8. The process of claim 7 wherein said Group IIIB metal is yttrium.

9. The process of claim 8 wherein said alkali cation is a sodium cation.

10. In a process for exchanging metal ions from one material to another material, the improvement comprising contacting a fluid exchange material containing metal ions with the metallophosphate of claim 1.

11. The process of claim 10 wherein said metallophosphate contains a metal selected from scandium, yttrium, lathanum or combinations thereof.

12. The process of claim 11 wherein said metal is yttrium.

13. The process of claim 10 wherein said metallophosphate is characterized by a powder X-ray diffraction pattern observed with CuKα radiation and a scan of 3° to 50° θ of at least:

| |
|---|
| 16.0 ± 0.2 |
| 9.2 ± 0.2 |
| 7.9 ± 0.2 |
| 6.8 ± 0.1 |
| 5.45 ± 0.05 |
| 4.47 ± 0.05 |
| 4.49 ± 0.05 |
| 3.79 ± 0.03 |
| 3.69 ± 0.03 |
| 3.38 ± 0.03 |
| 3.17 ± 0.03 |
| 3.06 ± 0.03 |
| 2.99 ± 0.03 |
| 2.94 ± 0.02 |
| 2.86 ± 0.02 |
| 2.77 ± 0.02 |
| 2.72 ± 0.02 |
| 2.68 ± 0.02 |

* * * * *

UNITED STATES PATENT AND TRADEMARK OFFICE
CERTIFICATE OF CORRECTION

PATENT NO. : 4,486,397

DATED : December 4, 1984

INVENTOR(S) : Reza Eshraghi, Frederick A. Pesa, Mike J. Desmond

It is certified that error appears in the above-identified patent and that said Letters Patent is hereby corrected as shown below:

Claim 5, column 9, line 52, "IIIA" should read -- IIIB --
and Claim 5, column 10, line 5, "IIIA" should read -- IIIB --.
In the abstract, "IIB" should read -- IIIB --.

Signed and Sealed this

Fourteenth Day of May 1985

[SEAL]

Attest:

DONALD J. QUIGG

Attesting Officer    Acting Commissioner of Patents and Trademarks